(12) United States Patent
Finnegan et al.

(10) Patent No.: US 10,739,545 B2
(45) Date of Patent: Aug. 11, 2020

(54) INDEXING ARCHITECTURE INCLUDING A FAN-OUT ARRANGEMENT

(71) Applicant: COMMSCOPE TECHNOLOGIES LLC, Hickory, NC (US)

(72) Inventors: Samuel Taylor Finnegan, Lisle, IL (US); Steven C. Zimmel, Minneapolis, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/326,078

(22) PCT Filed: Aug. 9, 2017

(86) PCT No.: PCT/US2017/046072
§ 371 (c)(1),
(2) Date: Feb. 15, 2019

(87) PCT Pub. No.: WO2018/034907
PCT Pub. Date: Feb. 22, 2018

(65) Prior Publication Data
US 2019/0187396 A1 Jun. 20, 2019

Related U.S. Application Data

(60) Provisional application No. 62/375,404, filed on Aug. 15, 2016.

(51) Int. Cl.
*G02B 6/44* (2006.01)
(52) U.S. Cl.
CPC ......... *G02B 6/4473* (2013.01); *G02B 6/4433* (2013.01); *G02B 6/4472* (2013.01); *G02B 6/4475* (2013.01); *G02B 6/4476* (2013.01)

(58) Field of Classification Search
CPC .......................................... G02B 6/4472–4475
See application file for complete search history.

(56) References Cited

U.S. PATENT DOCUMENTS

| 6,913,397 B2 | 7/2005 | Kang et al. |
| 9,207,421 B2 | 12/2015 | Conner |
| 9,348,096 B2 * | 5/2016 | Kmit .................. H04Q 11/0067 |
| 9,395,509 B2 | 7/2016 | Petersen et al. |
| 9,557,498 B2 | 1/2017 | Loeffelholz |
| 9,874,713 B2 | 1/2018 | Marcouiller et al. |
| 2010/0092133 A1 | 4/2010 | Conner |

(Continued)

FOREIGN PATENT DOCUMENTS

| EP | 1 981 185 A1 | 10/2008 |
| FR | 2 914 753 A1 | 10/2008 |

(Continued)

OTHER PUBLICATIONS

International Search Report and Written Opinion of the International Searching Authority for International Patent Application No. PCT/US2017/046072 dated Nov. 17, 2017, 17 pages.

(Continued)

*Primary Examiner* — Omar R Rojas
(74) *Attorney, Agent, or Firm* — Merchant & Gould P.C.

(57) ABSTRACT

The present disclosure relates to fiber optic components and structures for use in building fiber optic networks using an indexing architecture. In certain examples, fan-out structures are used.

20 Claims, 19 Drawing Sheets

(56) References Cited

U.S. PATENT DOCUMENTS

| | | |
|---|---|---|
| 2014/0105552 A1 | 4/2014 | Sun |
| 2015/0219864 A1 | 8/2015 | Leblanc et al. |
| 2016/0097909 A1* | 4/2016 | Loeffelholz .............. G02B 6/46 385/134 |
| 2016/0223759 A1 | 8/2016 | Marcouiller et al. |
| 2019/0258014 A1* | 8/2019 | Rousseaux ........... G02B 6/3885 |

FOREIGN PATENT DOCUMENTS

| | | |
|---|---|---|
| JP | H10-32545 A | 2/1998 |
| WO | 2013/149150 A1 | 10/2013 |
| WO | 2014/190281 A1 | 11/2014 |
| WO | 2015/200826 A1 | 12/2015 |
| WO | 2016/057411 A1 | 4/2016 |
| WO | 2016/132216 A1 | 8/2016 |
| WO | 2016/137934 A1 | 9/2016 |
| WO | 2017/132388 A1 | 8/2017 |

OTHER PUBLICATIONS

Extended European Search Report for European Patent Application No. 17841874.5 dated Feb. 28, 2020, 7 pages.

* cited by examiner

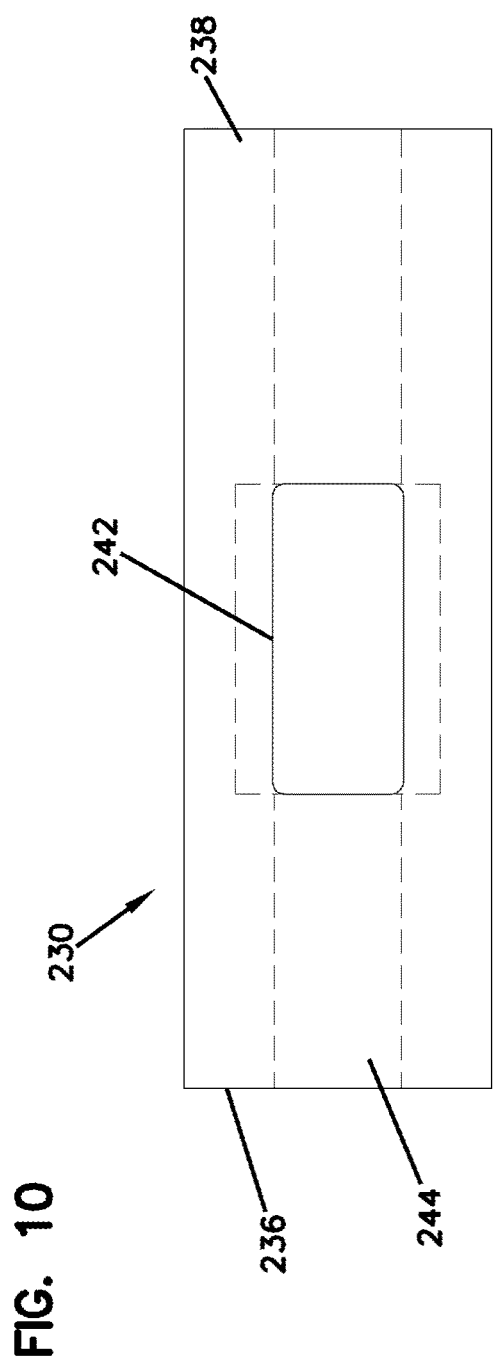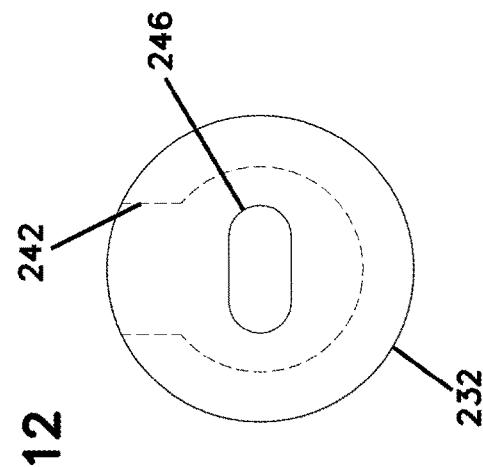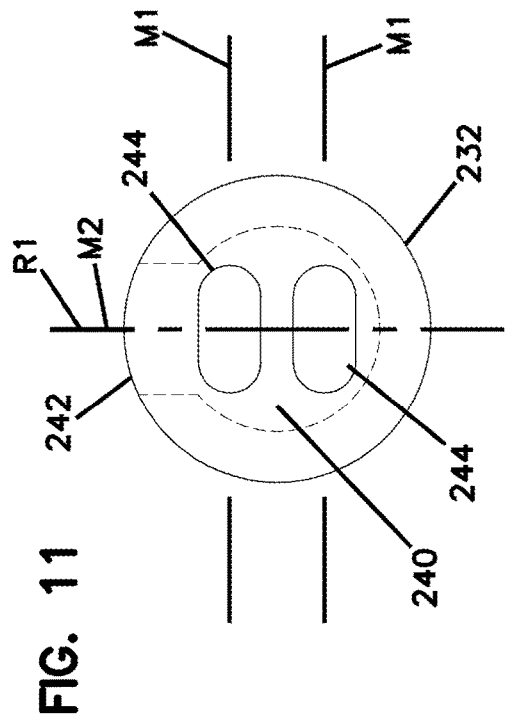

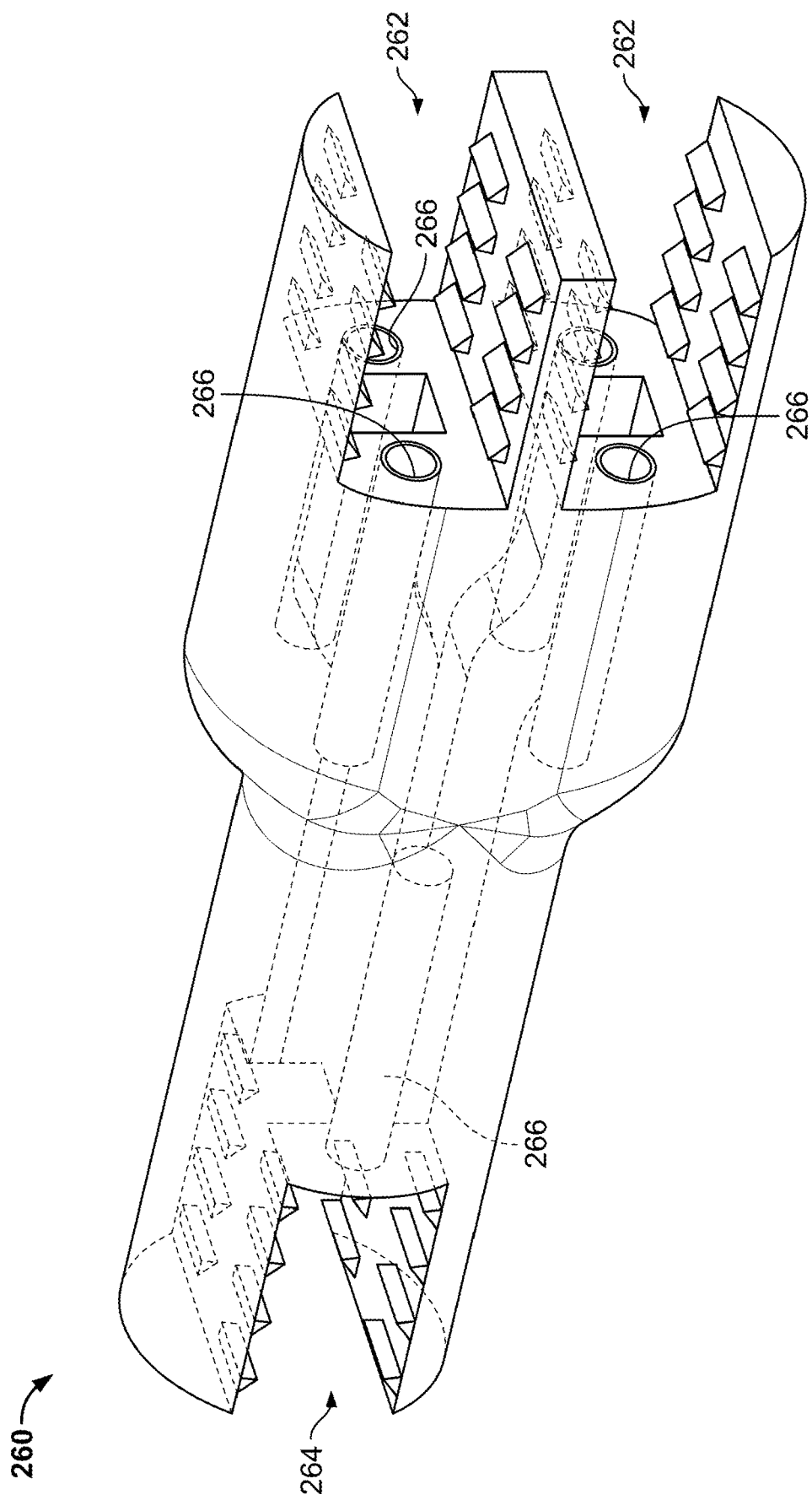

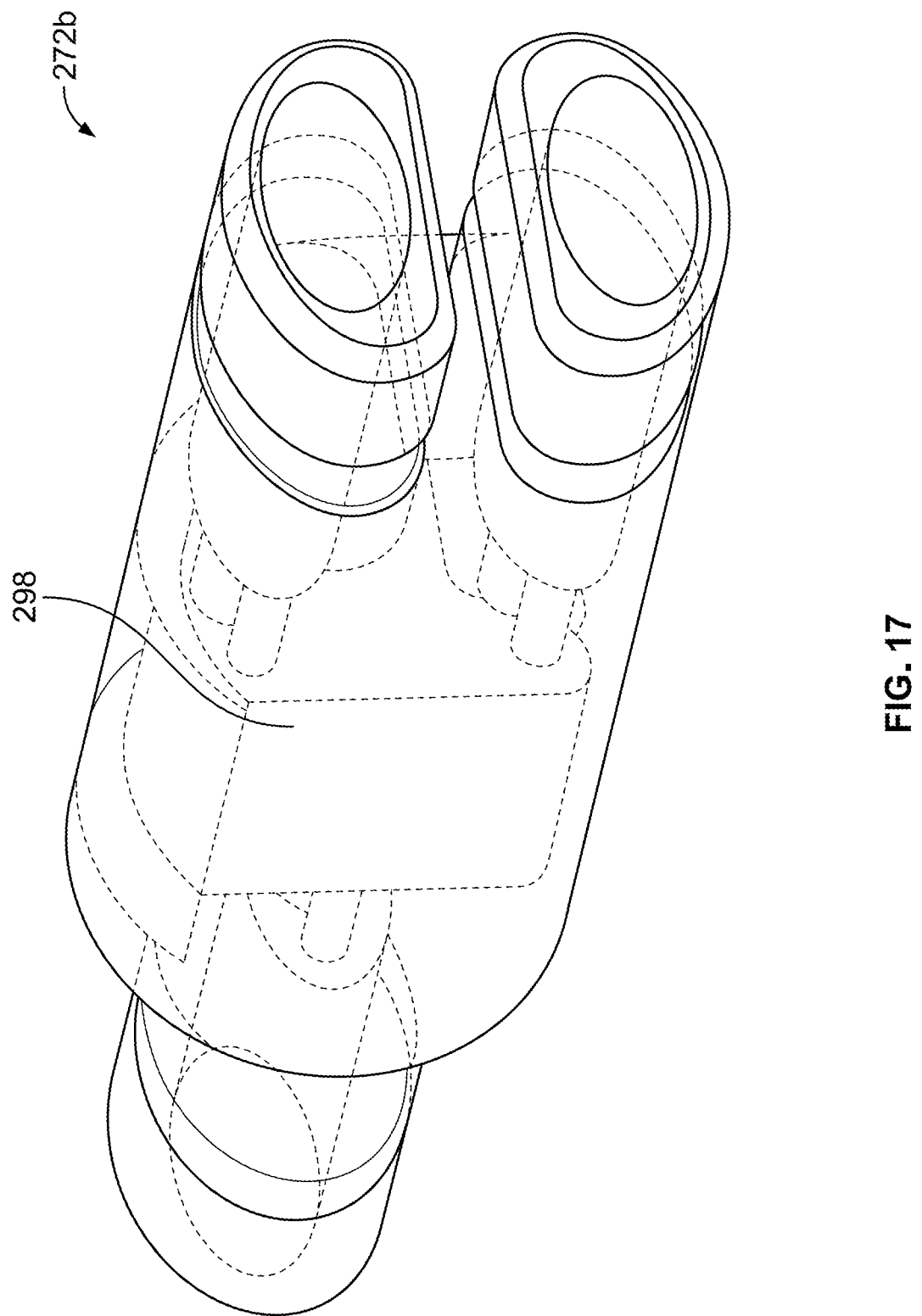

INDEXING ARCHITECTURE INCLUDING A FAN-OUT ARRANGEMENT

CROSS-REFERENCE TO RELATED APPLICATION

This application is a National Stage Application of PCT/US2017/046072, filed on Aug. 9, 2017, which claims the benefit of U.S. Patent Application Ser. No. 62/375,404, filed on Aug. 15, 2016, the disclosures of which are incorporated herein by reference in their entireties. To the extent appropriate, a claim of priority is made to each of the above disclosed applications.

TECHNICAL FIELD

The present disclosure relates generally to equipment for fiber optic communications networks. More particularly, the present disclosure relates to fiber optic networks including indexing architectures and fan-outs.

BACKGROUND

Optical networks are becoming increasingly prevalent in part because service providers want to deliver high bandwidth communication capabilities to customers. As the demand for optical networks increases, there is a need to extend fiber optic networks closer to the edge (i.e., closer to subscriber locations). In this regard, there is a need for cost-effective architectures for extending fiber optic networks. One example of a cost-effective architecture is an indexing architecture. Example indexing architectures are disclosed by PCT Int'l Publication No. WO 2014/190281.

SUMMARY

Aspects of the present disclosure relate to fiber optic networks having indexing architectures that utilize fan-outs.

Other aspects of the present disclosure relate to fiber optic networks having indexing architectures with indexing components adapted for indexing a relatively large number of optical fibers (e.g., greater than 12 fibers, or greater than 18 fibers, or greater than or equal to 24 optical fibers).

Another aspect of the present disclosure relates to indexing components that can be daisy-chained (e.g., coupled end-to-end) together to form an indexing architecture. In one example, each indexing component can include separate first multi-fiber connection interfaces defining a first set of sequential fiber positions defined by a combination of the first multi-fiber connection interfaces such that the sequential fiber positions are sequenced across the first multi-fiber connection interfaces. The indexing component can also include separate second multi-fiber connection interfaces defining a second set of sequential fiber positions defined by a combination of the second multi-fiber connection interfaces such that the sequential fiber positions are sequenced across the second multi-fiber connection interfaces. The indexing component also includes sets of optical fibers including a drop fiber that is routed from the first set of sequential fiber positions to a drop location and also including indexing fibers that are routed in an indexed configuration between the first set of sequential fiber positions and the second set of sequential fiber positions.

Another aspect of the present disclosure relates to an indexing component including stub-cables (e.g., break-out cables) terminating at multi-fiber connectors. The stub-cables include sets of optical fibers having ends supported at a first set of sequential fiber positions defined by a combination of the multi-fiber connectors such that the sequential fiber positions are sequenced across the multi-fiber connectors. The indexing component also includes a main cable including the sets of optical fibers, and a fan-out for coupling the stub-cables to the main cable. The indexing component further includes separate multi-fiber connection interfaces defining a second set of sequential fiber positions defined by a combination of the multi-fiber connection interfaces such that the sequential fiber positions are sequenced across the multi-fiber connection interfaces. The sets of optical fibers include a drop fiber that is routed from the first set of sequential fiber positions to a drop location. The sets of optical fibers also include indexing fibers that are routed in an indexed configuration between the first set of sequential fiber positions and the second set of sequential fiber positions.

Another aspect of the present disclosure relates to an indexing component including first and second stub-cables (e.g., break-out cables) terminating respectively at first and second multi-fiber connectors. The first stub cable includes a first set of optical fibers having ends supported at first sequential fiber positions defined by the first multi-fiber fiber connector. The second stub cable includes a second set of optical fibers having ends supported at second sequential fiber positions defined by the second multi-fiber connector. The indexing component also includes a main cable including the first and second sets of optical fibers, and a fan-out for coupling the first and second stub-cables to the main cable. The indexing component further includes a first multi-fiber connection interface defining third sequential fiber positions, and a second multi-fiber connection interface defining fourth sequential fiber positions. The first set of optical fibers includes a drop fiber that is routed from the first multi-fiber connector to a drop location. The first set of optical fibers also includes indexing fibers that are routed in an indexed configuration between the first sequential fiber positions and the third sequential fiber positions. The second set of optical fibers includes first indexing fibers that are routed in an indexed configuration between the second sequential fiber positions and the fourth sequential fiber positions. In certain examples, the second set of optical fibers can also include a second indexing fiber that is routed in an indexed configuration from the second multi-fiber connector to the first multi-fiber connection interface.

Certain other aspects of the present disclosure relate to fan-out configurations that can be used in components for supporting indexing architectures as well as other components where separating or fanning-out optical fibers are desired.

In one example, a specialty cable is utilized to provide a fan-out location. The fiber optic cable can include a pre-defined tear-location for separating the cable into two separate sections that function as stub-cables (e.g., break-out cables). In certain examples, the pre-defined tear-location is defined at a central location of the cable. In certain examples, the pre-defined tear-location is defined by notches that provide a reduced cross-sectional area for facilitating separating the two segments apart from one another. In certain examples, each of the separate segments includes a passage for receiving a set of optical fibers and a passage for receiving a strength member such as a glass reinforced polymeric (GRP) rod. In certain examples, the cable has an elongate transverse cross-sectional profile that defines a major axis extending through the fiber passages and the strength members and a minor axis that extends through the notches. In certain examples, a reinforcing structure such as a clip, housing, bracket or retainer can be mounted on the cable to prevent the cable from separating beyond a predetermined location. In certain examples, a first fiber passage and a first strength member are positioned on one side of the pre-determined tear-location and a second fiber passage and a second strength member are positioned on an opposite of the pre-defined tear-location.

Another aspect of the present disclosure relates to a fan-out structure including a block, tube, or other component that is filled with epoxy to anchor stub-cables (e.g., break-out cables, furcation cables, etc.) to a main cable and to seal the ends of the cables. In certain examples, the fan-out block can have a first end defining two receptacles for receiving ends of the stub-cables and a second end defining a receptacle for receiving the main cable. The fan-out block can define a central open region (e.g., a cavity accessible through a side window) defined between the receptacles for receiving adhesive such as epoxy. Strength members of the stub-cables and main cable can extend into the open region or cavity. An enlarged window can be provided in communication with the cavity for filling the cavity with an epoxy and for facilitating routing optical fibers from the main cable to the stub-cables. In certain examples, the stub-cables are formed by furcation tubes that receive optical fibers from the main cable. In certain examples, the receptacles for receiving the cables have elongate transverse cross-sectional shapes or profiles that correspond to elongate transverse cross-sectional shapes or profiles of the cables. In certain examples, the transverse cross-sectional profiles include major axes and minor axes. In certain examples, major axes of the transverse cross-sectional profiles are aligned along reference planes that extend through the window of the central cavity. In certain examples, a heat shrink sleeve including a shape memory material surrounding an adhesive layer can be mounted over the fan-out block and over portions of the stub-cables and the main cable to provide cable strain relief and to improve aesthetics. In certain examples, the fan-out block is made of a transparent plastic material.

A further aspect of the present disclosure relates to a fan-out device including a fan-out body having a furcated end with at least two separate legs or extensions. Each of the legs or extensions defines a receptacle for receiving a stub-cable (e.g., a break-out cable or furcation cable). The fan-out body can also define passages or receivers for receiving strength members of the stub-cables. Adhesive such as epoxy can be used to secure the strength-members within the strength member receivers. Side ports can be provided for injecting epoxy into the strength member receivers. The separate legs or extensions allow separate shape-memory elements (e.g., shrink-fit sleeves including internal adhesive) to be mounted over each of the legs and also over each of the corresponding stub-cables. Thus, the shape-memory sleeves can be used to seal each of the stub-cables. An opposite end of the fan-out structure can include a receptacle for receiving a main cable. Strength member receptacles can be provided for receiving strength members of the main cable. Adhesive injection ports can be provided in fluid communication with the strength member receptacles. One or more passages can be provided within the fan-out structure for routing sets of optical fibers from the main cable to the stub-cables. It will be appreciated that the stub-cables can be formed by furcation tubes/furcation cables. In practice, an end portion of a jacket of the main cable can be stripped away thereby exposing lengths of sets of optical fibers. The exposed lengths of optical fibers can be routed through the fan-out and into the furcation tubes/cables. Thereafter, the ends of the furcation tubes can be connectorized to form the stub-cable assemblies. In certain examples, a third heat shrink can be used to seal and provide strength relief between the main cable and the end of the fan-out structure. In certain examples, the fan-out structure can be made of a transparent material or other type of material that allows the passage of UV-light for curing adhesive therein. In certain examples, a cover or outer housing can be used to cover the fan-out structure and also cover at least portions of the heat shrink sleeves.

Still another aspect of the present disclosure relates to a fan-out arrangement including a fan-out housing having a first end and an opposite second end. Stub-cables (i.e., break-out cables or furcation cables) are routed through the first end. The stub-cables can be sealed by an elastomeric gasket arrangement loaded within the housing. A main cable can be routed into the fan-out housing through the second end. An elastomeric gasket can be used to seal the second end of the housing. An anchor member can be secured within the housing. The anchor member can include strength member receptacles for receiving strength members corresponding to the stub-cables and the main-cable. The anchor member can also include a passage for allowing a first set of optical fibers from the main cable to be routed to one of the stub-cables and a second set of optical fibers from the main cable to be routed to the other of the stub-cables. In certain examples, the gaskets can include a plurality of deformable ribs. In certain examples, the gaskets can also include tapered portions that are compressed about the cables by compression fittings, plugs or inserts that fit within the ends of the fan-out housing.

A variety of additional aspects will be set forth in the description that follows. These aspects can relate to individual features and to combinations of features. It is to be understood that both the forgoing general description and the following detailed description are exemplary and explanatory only and are not restrictive of the broad concepts upon which the examples disclosed herein are based.

BRIEF DESCRIPTION OF THE DRAWINGS

FIG. 10 is a top view of the fan-out block of FIG. 9;

FIG. 11 is a first end view of the fan-out block of FIG. 9;

FIG. 12 is an end view of a second end of the fan-out block of FIG. 9;

FIG. 16 illustrates another fan-out structure in accordance with the principles of the present disclosure;

FIG. 17 illustrates still another fan-out structure in accordance with the principles of the present disclosure;

DETAILED DESCRIPTION

Reference will now be made in detail to exemplary aspects of the present disclosure that are illustrated in the accompanying drawings. Wherever possible, the same reference numbers will be used throughout the drawings to refer to the same or like structure.

Aspects of the present disclosure relate to components for supporting indexing architectures. In certain examples, the components can include fan-out structures. In certain examples, the indexing architectures can include forward and reverse indexing. It will be appreciated that examples of forward and reverse indexing architectures and of systems where multiple indexing components are daisy-chained together are disclosed by PCT Int'l Publication No. WO 2014/190281 which is hereby incorporated by reference in its entirety.

Figure 1:
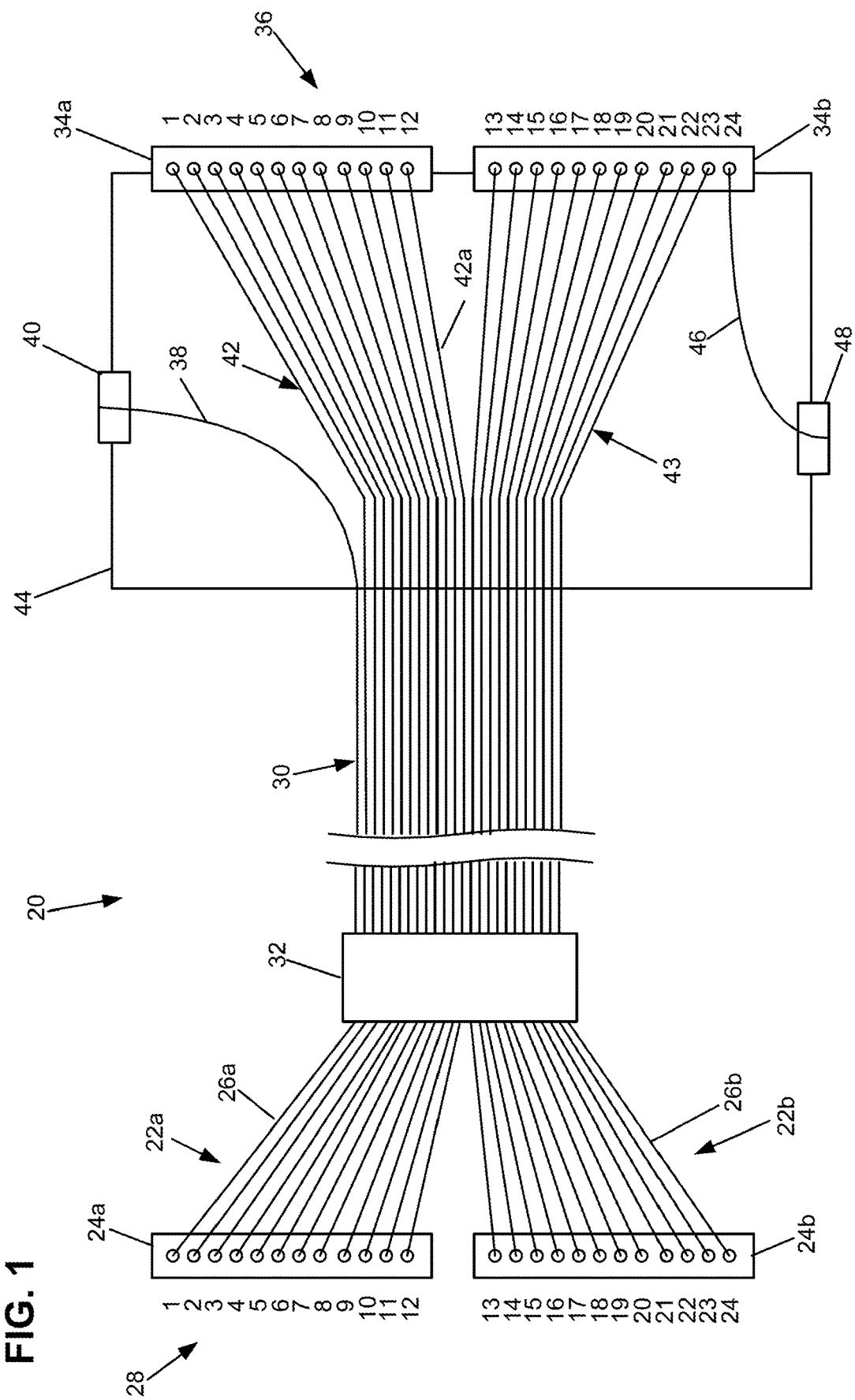
FIG. 1 is a schematic view showing an indexing component in accordance with the principles of the present disclosure.

FIG. 1 illustrates an indexing component 20 in accordance with the principles of the present disclosure. The indexing component 20 includes two stub-cables 22a, 22b terminating at multi-fiber connectors 24a, 24b. The multi-fiber connectors 24a, 24b can include multi-fiber ferrules. The stub-cables 22a, 22b respectively include sets of optical fibers 26a, 26b having ends supported at a first set of sequential fiber positions (e.g., positions 1-24) defined by a combination of the multi-fiber connectors 24a, 24b. For example, the multi-fiber ferrule of the multi-fiber connector 24a defines positions 1-12 of the first set of sequential fiber positions 28. Also, the multi-fiber ferrule of the multi-fiber connector 24b defines positions 13-24 of the first set of sequential fiber positions 28. The indexing component 20 also includes a main cable 30 including the sets of optical fibers 26a, 26b. The indexing component 20 further includes a fan-out structure 32 for coupling the stub-cables 22a, 22b to the main cable 30. The indexing component 20 further includes separate multi-fiber connection interfaces 34a, 34b each including separate multi-fiber ferrules. The multi-fiber connection interfaces 34a, 34b define a second set of sequential fiber positions 36 defined by the combination of the multi-fiber connection interfaces 34a, 34b such that the sequential fiber positions are sequenced across the multi-fiber connection interfaces 34a, 34b. For example, positions 1-12 of the second set of sequential fiber positions 36 are defined by the multi-fiber connection interface 34a, while positions 13-24 of the second set of sequential fiber positions 36 are defined by the multi-fiber connection interface 34b.

Referring still to FIG. 1, the sets of optical fibers 26a, 26b include a drop fiber 38 that is routed from the first set of sequential fiber positions 28 (e.g., position 1) to a drop location 40. The sets of optical fibers 26a, 26b also can include indexing fibers 42 that are routed in an indexed configuration between the first set of sequential fiber positions 28 and the second set of sequential fiber positions 36. It is noted that indexing fiber 42a is indexed from position 13 of the multi-fiber connector 24b to position 12 of the multi-fiber connection interface 34a. Indexing fibers 43 are routed from positions 14-24 of the multi-fiber connector 24b are to positions 13-23 of the multi-fiber connection interface 34b. Indexing fibers 42 are routed from positions 2-12 of the multi-fiber connector 24a to positions 1-11 of the multi-fiber connection interface 34a.

In certain examples, the multi-fiber connectors 24a, 24b can include ruggedized fiber optic connectors. A ruggedized fiber optic connector is typically environmentally sealed and includes a robust fastening element for coupling to a corresponding connector or fiber optic adapter. Example fastening components can include twist-to-lock fasteners such as threaded sleeves, threaded nuts or bayonet-style fasteners.

In certain examples, the multi-fiber connection interfaces 34a, 34b can be provided on a housing or terminal 44. For example, the multi-fiber connection interfaces 34a, 34b can be incorporated within ruggedized ports or adapter ports defined by the terminal 44. Additionally, the drop location 40 can also include a ruggedized port for coupling to a ruggedized connector of a drop line or other device. It is noted that the indexing component 20 also includes drop fiber 46 routed from position 24 of the second set of sequential fiber positions 36 to drop location 48. Drop location 48 can also include a ruggedized port. In other examples, multiple fibers can be routed to each drop location and the drop locations can include multi-fiber connection interfaces or a plurality of single fiber drop interfaces.

Figure 2:
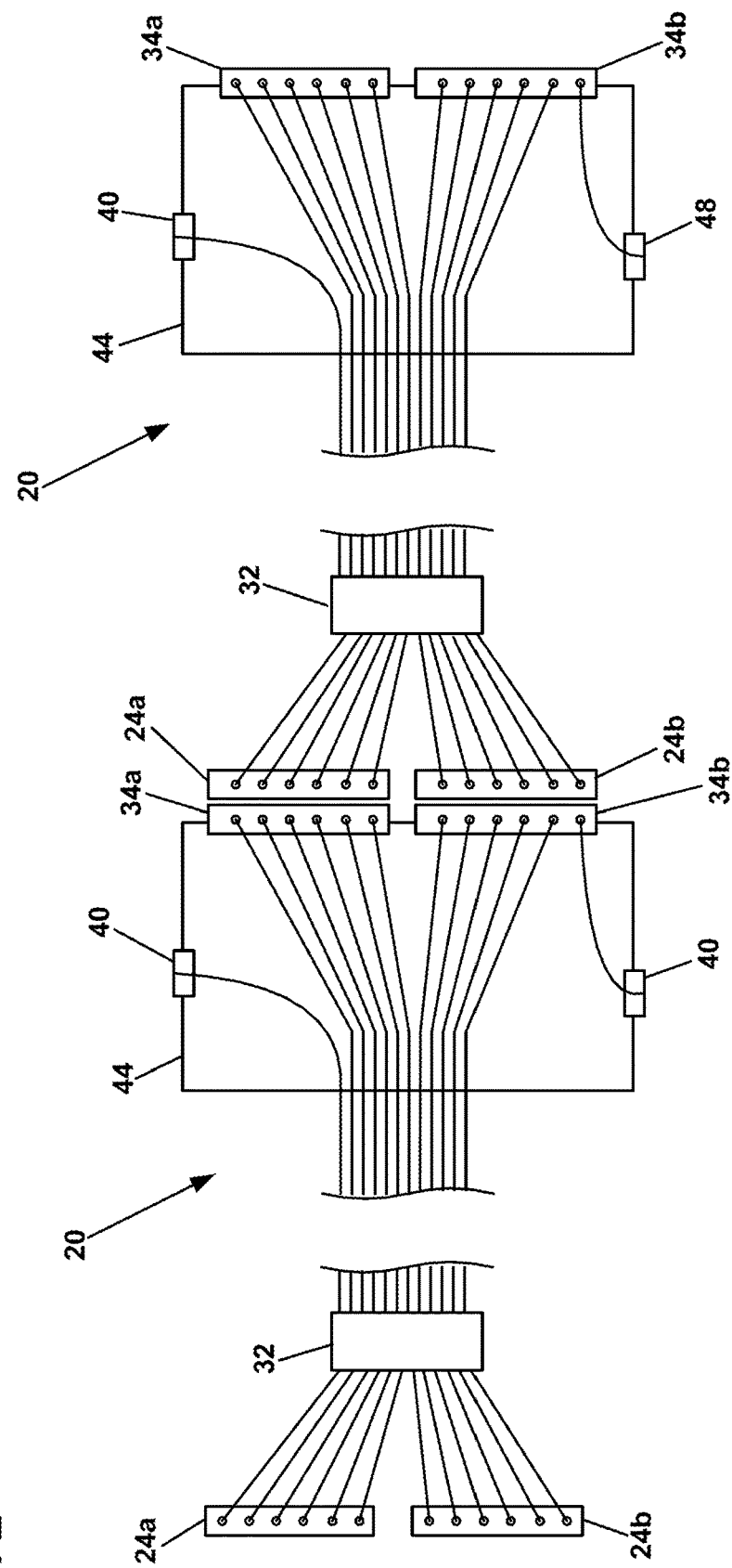
FIG. 2 shows two of the indexing components of FIG. 1 daisy-chained together; for ease of depiction only six fibers have been shown corresponding to each of the multi-fiber connection interfaces.

FIG. 2 shows two of the indexing components 20 coupled together. It will be appreciated that in FIG. 2, only six fibers are shown for each of the multi-fiber connectors 24a, 24b and for each of the multi-fiber connection interfaces 34a, 34b. This has been done for clarity to prevent the lines from bleeding together.

Figure 3:
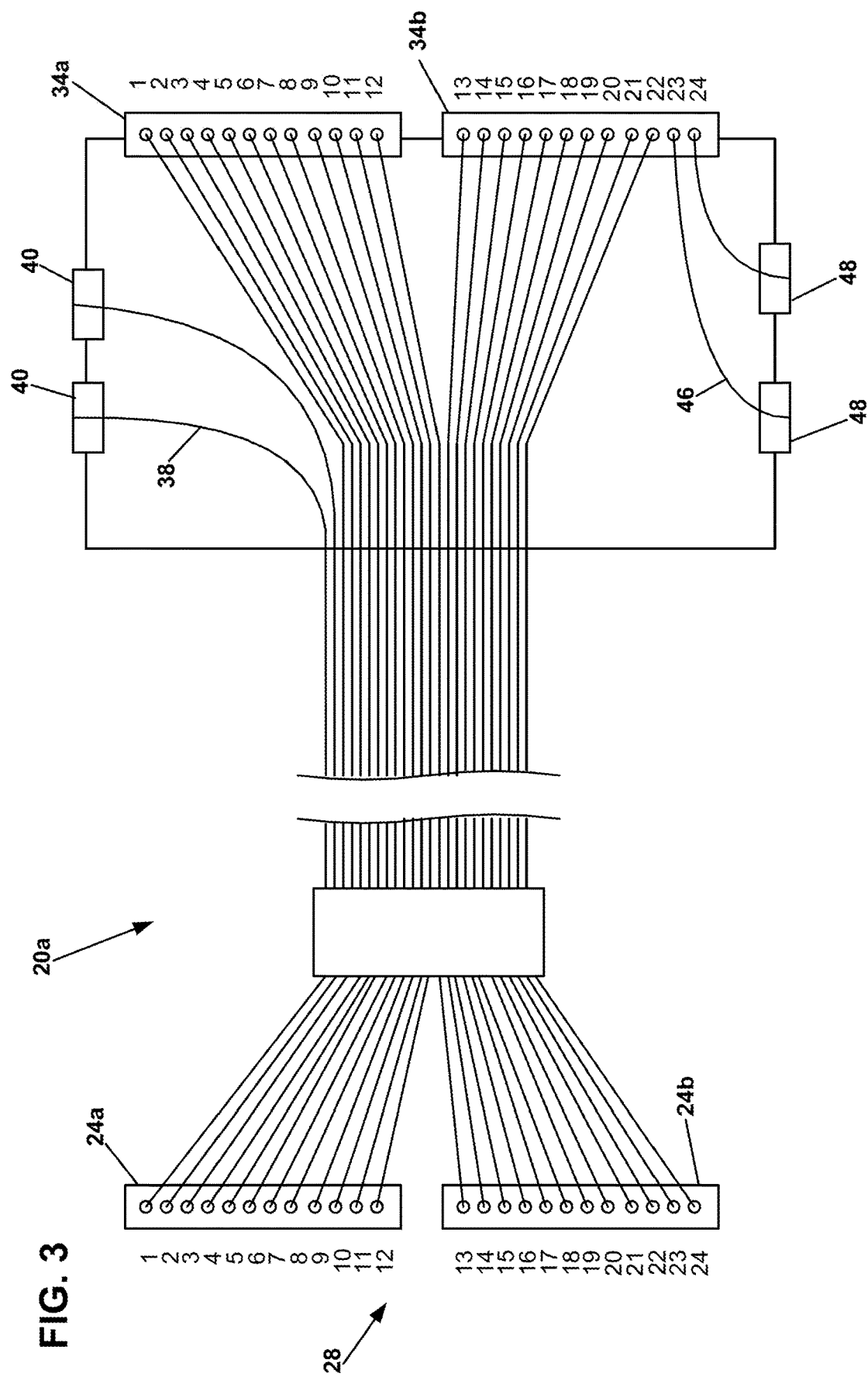
FIG. 3 illustrates another indexing component in accordance with the principles of the present disclosure.

FIG. 3 shows another indexing component 20a having the same basic configuration as the indexing component 20 except two forward drop locations 40 have been provided and two reverse locations 48 have been provided. Also, the indexing fibers have been indexed two positions from the first set of sequential fiber positions 28 to the second set of sequential fiber positions 36. Thus, ten optical fibers have been indexed from the multi-fiber connector 24a to the multi-fiber connection interface 34a, two optical fibers have been indexed from the multi-fiber connector 24b to the multi-fiber connection interface 34a, and ten optical fibers have been indexed from the multi-fiber connector 24b to the multi-fiber connection interface 34b.

Figure 4:
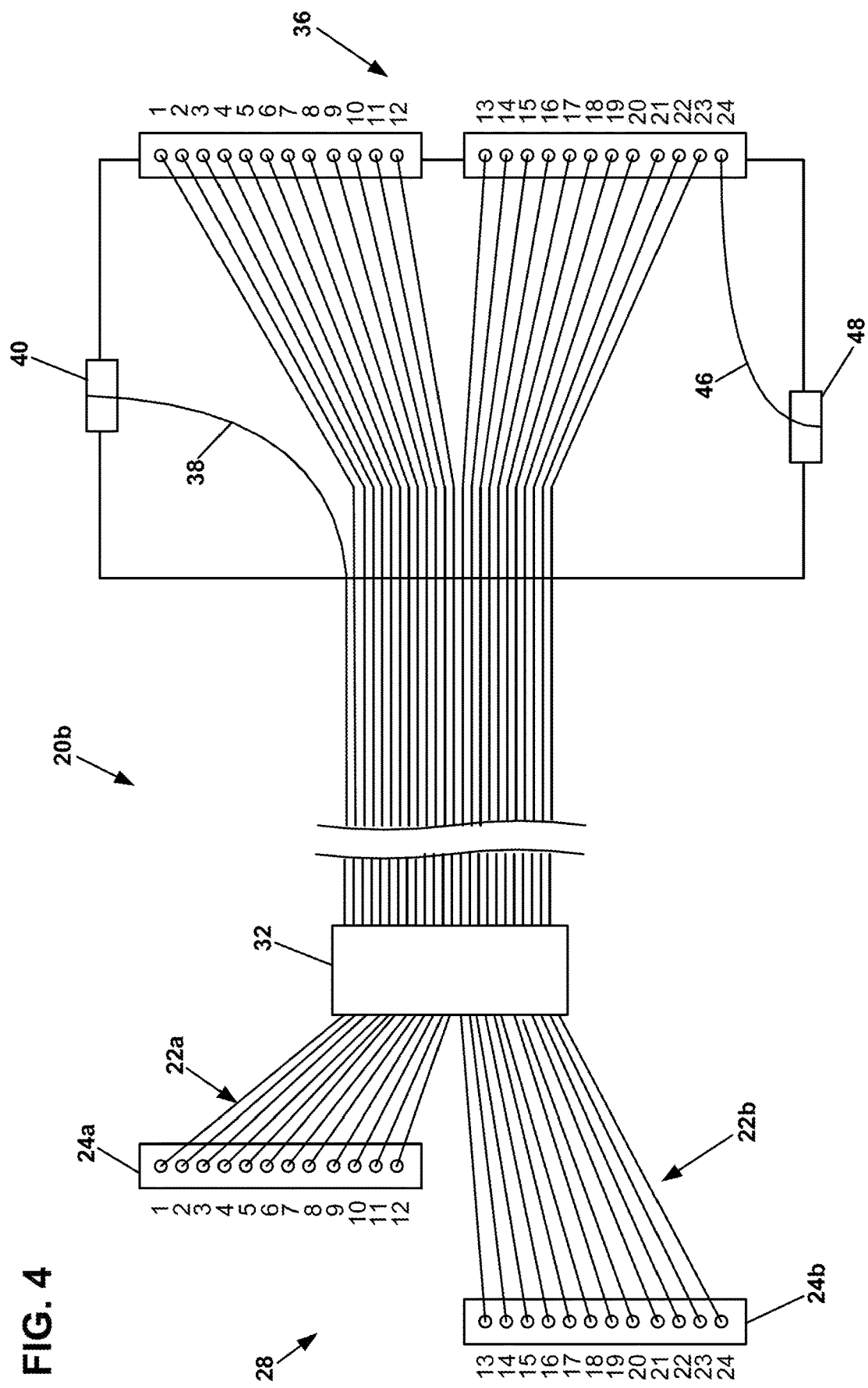
FIG. 4 illustrates still another indexing component in accordance with the principles of the present disclosure.

FIG. 4 shows an indexing component 20b having the same configuration as the indexing component 20 except the multi-fiber connectors 24a, 24b have been axially staggered relative to one another. Specifically, the stub-cables 22a, 22b have been provided with different lengths. By staggering the multi-fiber connectors 24a, 24b, the multi-fiber connectors 24a, 24b have a reduced cross-sectional profile which is helpful when passing such multi-fiber connectors 24a, 24b through a conduit.

Figure 5:
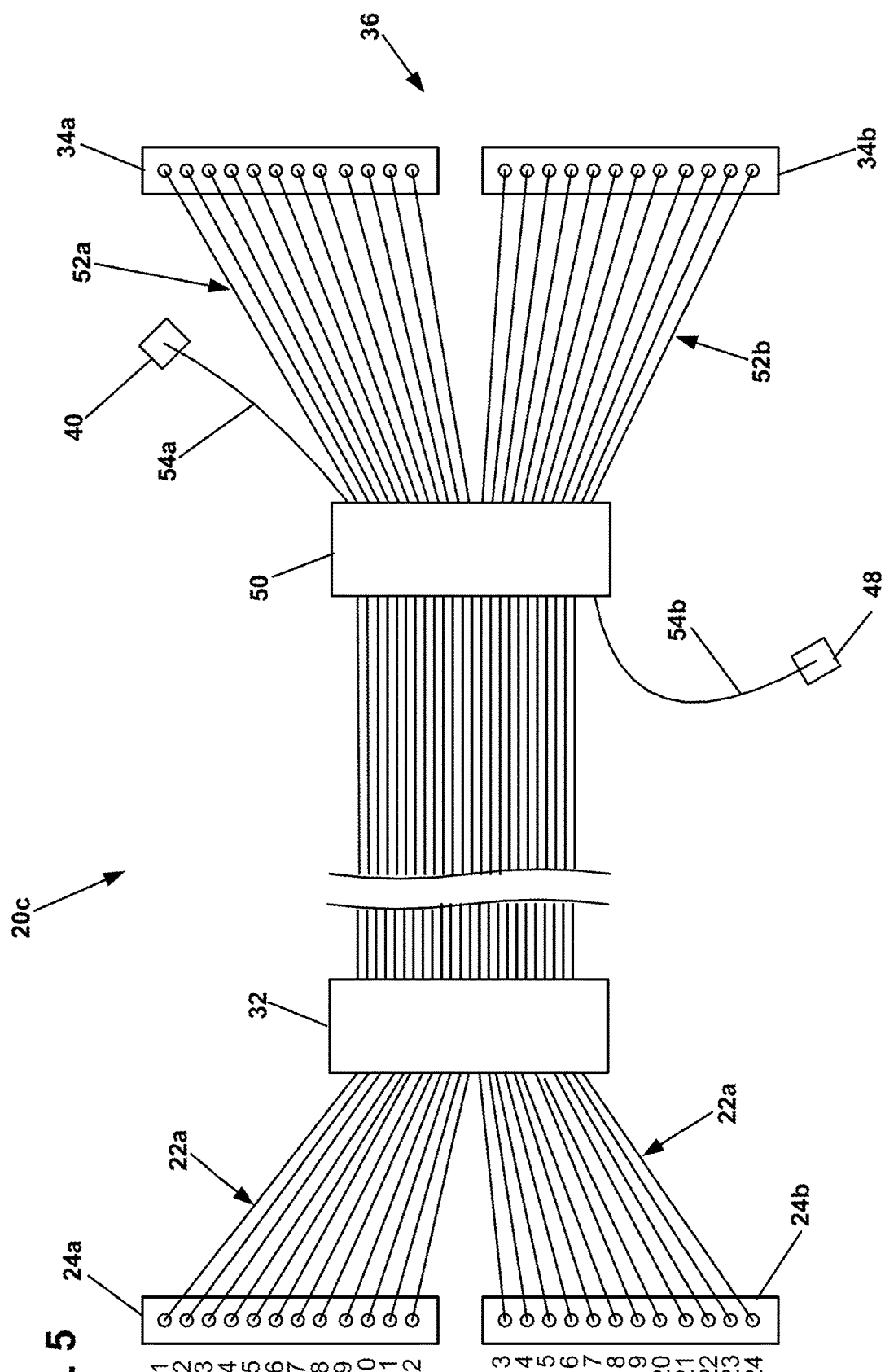
FIG. 5 illustrates a further indexing component in accordance with the principles of the present disclosure.

FIG. 5 illustrates an indexing component 20c that has the same general configuration as the indexing component 20 except the terminal 44 has been replaced with a fan-out configuration. In this configuration, a fan-out structure 50 has been provided. The multi-fiber connection interfaces 34a, 34b have been provided by multi-fiber connectors mounted at the end of stub-cables 52a, 52b and drop locations 40, 48 have been shown as single-fiber fiber optic connectors mounted on the end of stub-cables 54a, 54b.

Figure 6:
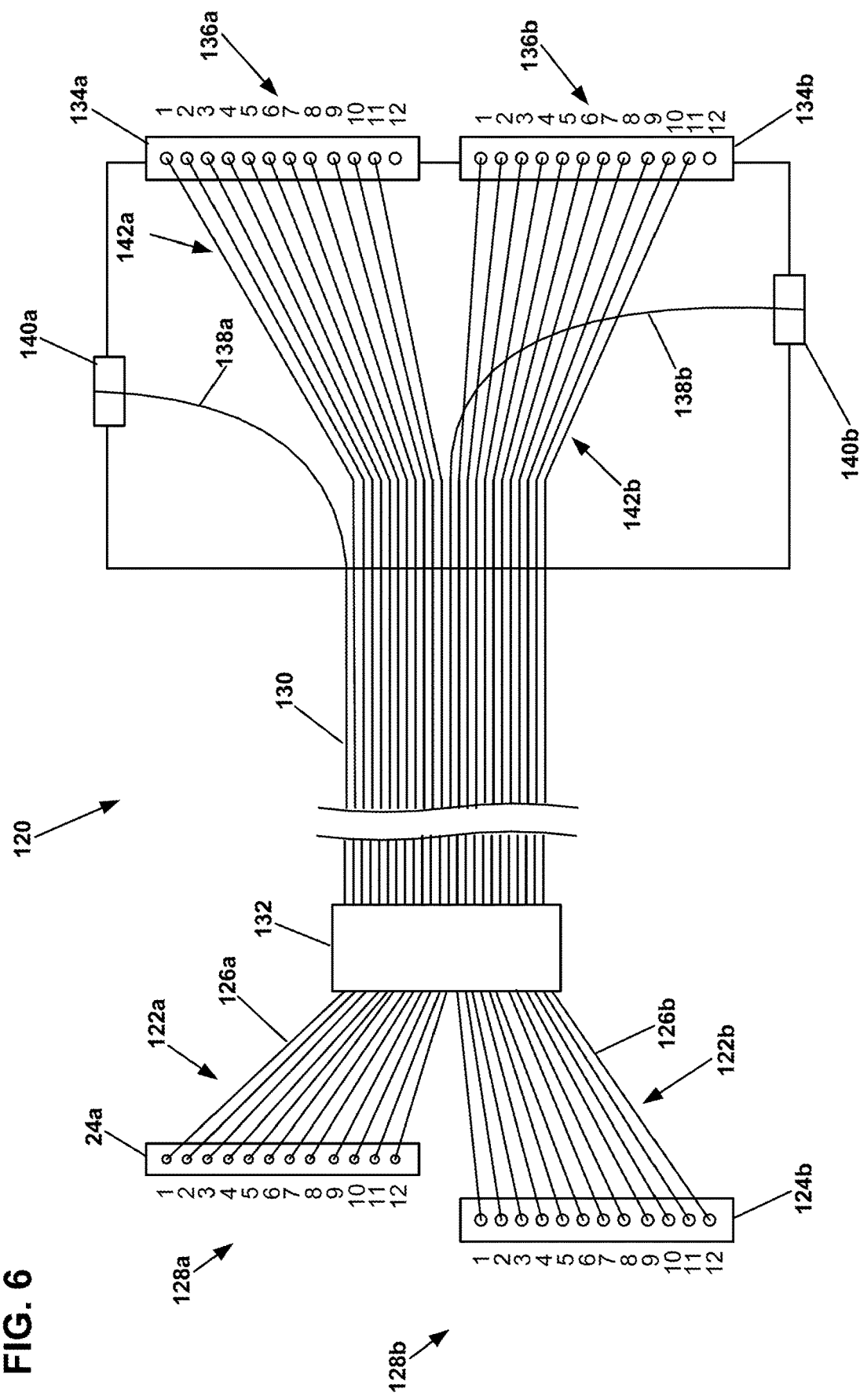
FIG. 6 illustrates an additional indexing component in accordance with the principles of the present disclosure.

FIG. 6 shows still another indexing component 120 in accordance with the principles of the present disclosure. In this example, rather than spreading a sequence of fiber positions across multiple multi-fiber connection interfaces, each multi-fiber connection interface has a separate fiber position sequence for indexing purposes. Thus, indexing does not occur across multiple multi-fiber connection interfaces.

Referring to FIG. 6, the indexing component 120 includes a first stub-cable 122a terminating at a first multi-fiber connector 124a. The first stub-cable 122a includes a first set of optical fibers 126a having ends supported at first sequential fiber positions 128a defined by the first multi-fiber connector 124a. The indexing component 120 also includes a second stub-cable 122b terminating at a second multi-fiber connector 124b. The second stub-cable 122b includes a second set of optical fibers 126b having ends supported at second sequential fiber positions 128b defined by the second multi-fiber connector 124b. The indexing component also includes a main cable 130 including the first and second sets of optical fibers 126a, 126b. The indexing component 120 further includes a fan-out structure 132 for coupling the first and second stub-cables 122a, 122b to the main cable 130. The indexing component 120 further includes a first multi-fiber connection interface 134a defining third sequential fiber positions 136a and a second multi-fiber connection interface 134b defining fourth sequential fiber positions 136b. The first set of optical fibers 126a includes a drop fiber 138a that is routed from the first multi-fiber connector 124a to a drop location 140a. The first set of optical fibers 126a includes indexing fibers 142a that are routed in an indexed configuration between the first sequential fiber positions 128a and the third sequential fiber positions 136a. The second set of optical fibers 126b includes indexing fibers 142b that are routed in an indexed configuration between the second sequential fiber positions 128b and the fourth sequential fiber positions 136b. The second set of optical fibers 126b can also include a drop fiber 138b that is routed from the second multi-fiber connector 124b to a drop location 140b.

It will be appreciated that a variety of fan-out configurations can be used to breakout the stub-cables from the main cable. A variety of fan-out structures, devices, blocks and arrangements suitable for use with the architectures of FIGS. 1-6 are set forth at FIGS. 7-25. The fan-out structures of FIGS. 7-25 can also be used for fan-out applications other than indexing architectures.

Figure 7:
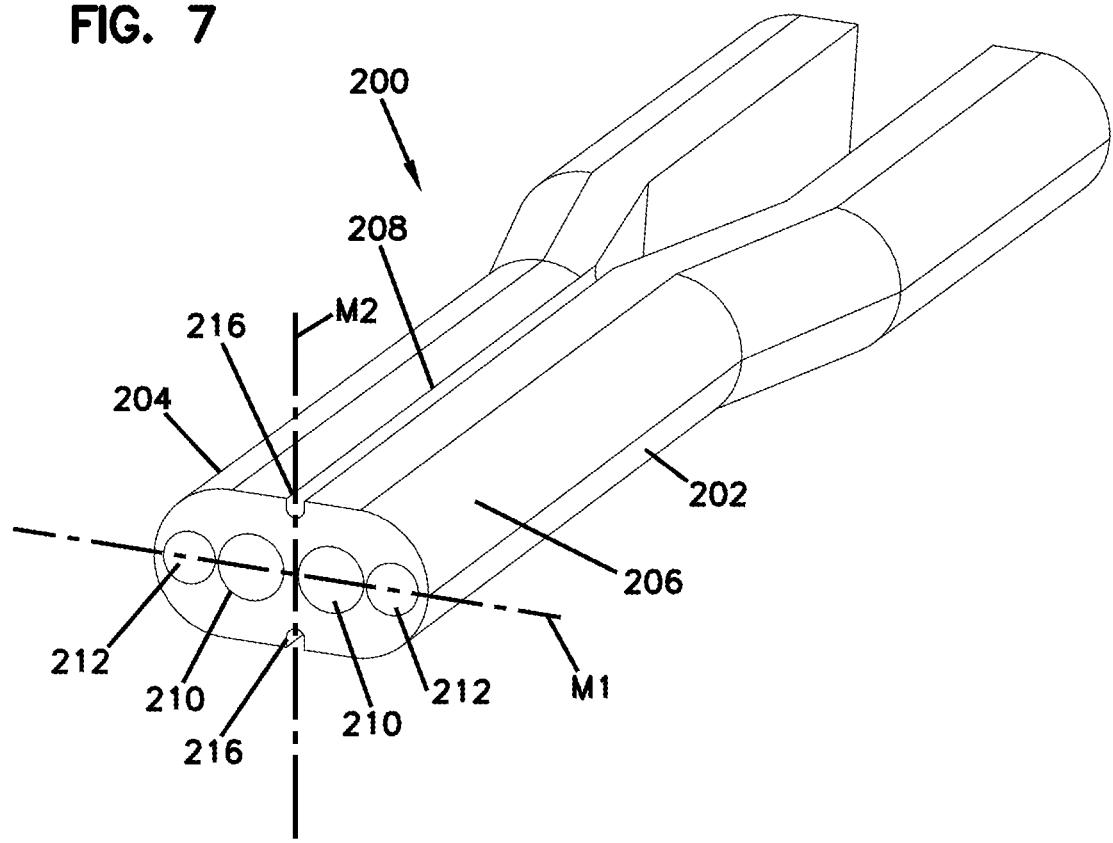
FIG. 7 is a first view of a specialty cable for supporting fan-out applications.
Figure 8:
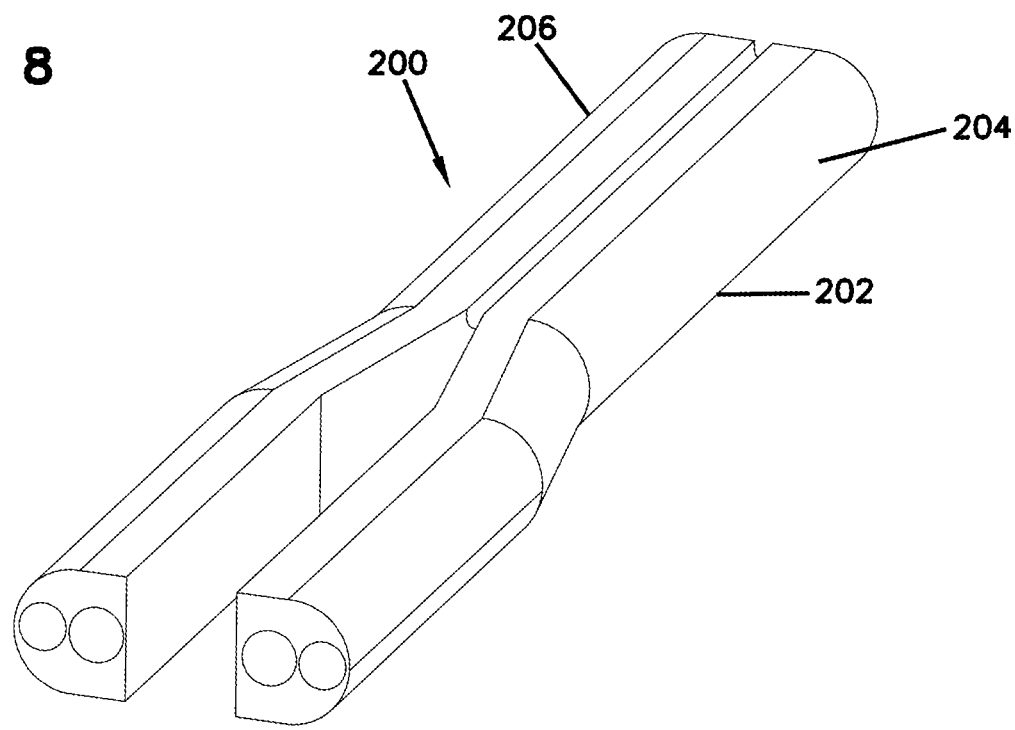
FIG. 8 is another view of the specialty cable of FIG. 7.
Figure 9:
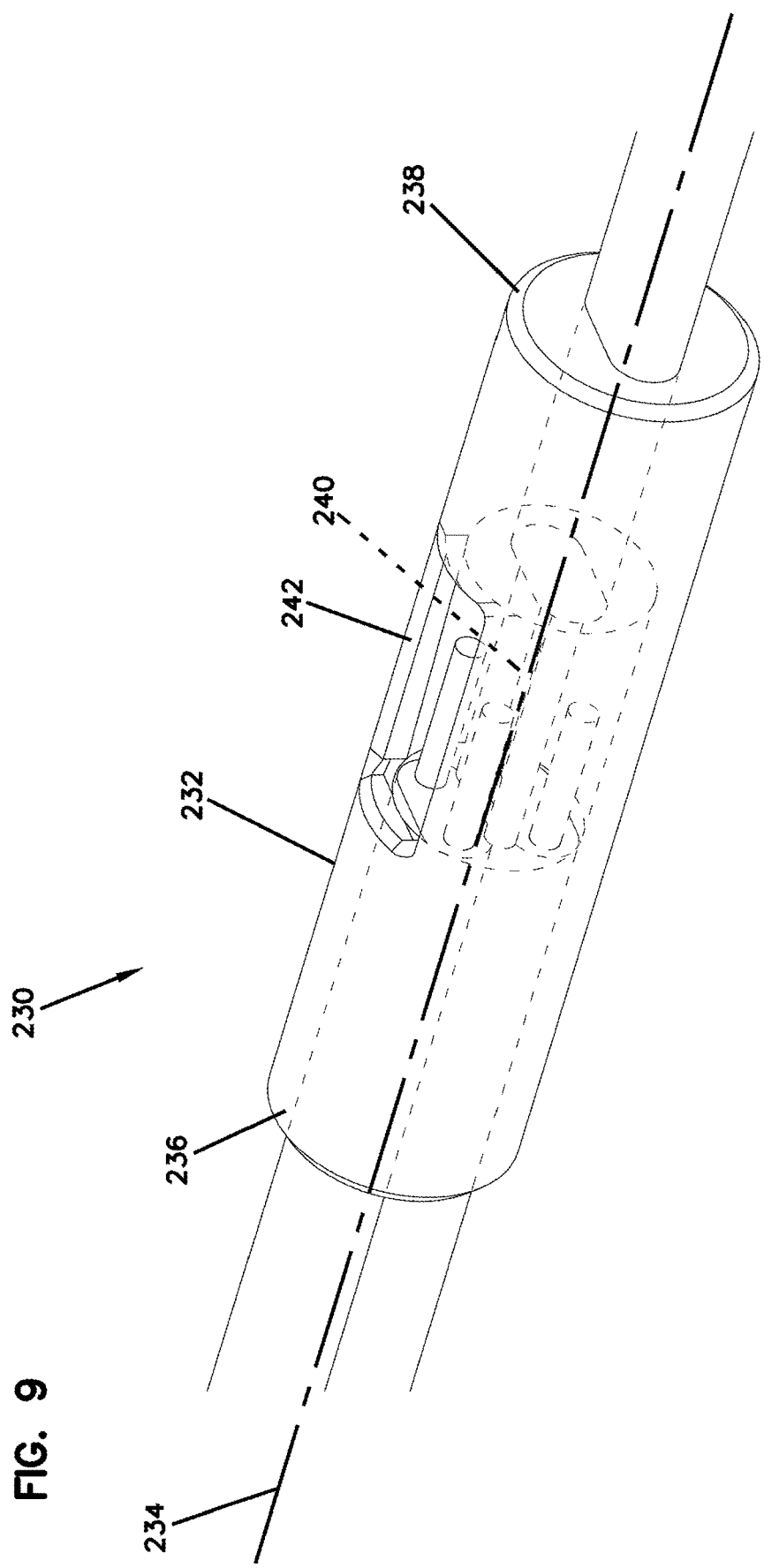
FIG. 9 is a perspective view of a fan-out block in accordance with the principles of the present disclosure.

FIGS. 7 and 8 depict a cable 200 in accordance with the principles of the present disclosure. The cable 200 is adapted for providing an integrated fan-out location and includes a cable jacket 202 including a first section 204 and a second section 206 with a predefined tear location 208 defined between the first and second sections 204, 206. Each of the first and second sections 204, 206 defines a fiber passage 210 for receiving at least one optical fiber and a strength member passage 212 in which a strength member 214 is positioned. In one example, the predefined tear location 208 is defined by exterior notches 216 in the jacket. In one example, a plurality of optical fibers (e.g., a set of 12 optical fibers) is provided in each fiber passage 210 and the strength members 214 include glass reinforced polymeric rods.

In one example, the jacket 202 has an elongate transverse cross-sectional profile having a major axis M1 and a minor axis M2. In this example, wherein the predefined tear location 208 is positioned along the minor axis M2, and the fiber passages 210 as well as the strength member passages 212 are aligned along the major axis M1.

FIGS. 9-12 depict a fan-out structure 230 in accordance with the principles of the present disclosure. The fan-out structure 230 includes a fan-out block 232 that extends along an axis 234. The fan-out block 232 has a first axial end 236 and an opposite second axial end 238. The fan-out block 232 defines a central epoxy (i.e., adhesive) cavity 240 accessible through an enlarged side window 242. The side window has at least one dimension that extends a across at least a majority of a width of the fan-out block 232. The first axial end 236 defines two first axial cable receptacles 244 in fluid communication with the central epoxy cavity 240. The second axial end 238 defines a single second axial cable receptacle 246 in fluid communication with the central epoxy cavity 240. The enlarged window facilitates routing optical fibers from the main cable through the cable receptacles 244 for subsequent routing through the stub cables. In one example, a group of 12 fibers is routed through the fan-out to each of the cable receptacles 244.

In one example, first cable receptacles 244 and the second cable receptacle 246 each have elongated transverse cross-sectional shapes sized to match a corresponding transverse cross-sectional profile of a cable jacket of a cable desired to be inserted therein. Strength members of the cables corresponding to the first and second cable receptacles 244, 246 are all secured within the same central epoxy cavity 240. Optical fibers from main cable secured at the second cable receptacle 246 are routed through the central epoxy cavity 240 to stub cables secured at the first axial cable receptacles 244. The fan-out block 232 can be constructed of a plastic material through which ultraviolet light can pass. A single heat shrink sleeve can be positioned over the fan-out block, the stub cables and the main cable to provide cable strain relief and to enhance the aesthetic appearance of the fan-out.

Figure 13:
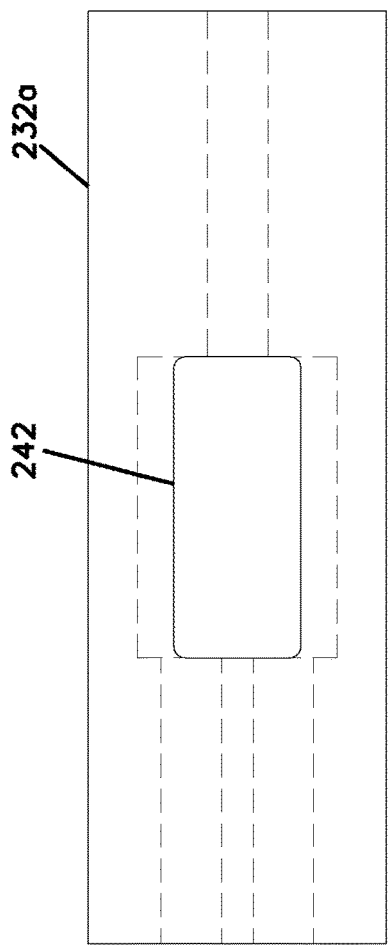
FIG. 13 is a top view of an alternative fan-out block in accordance with the principles of the present disclosure.
Figure 15:
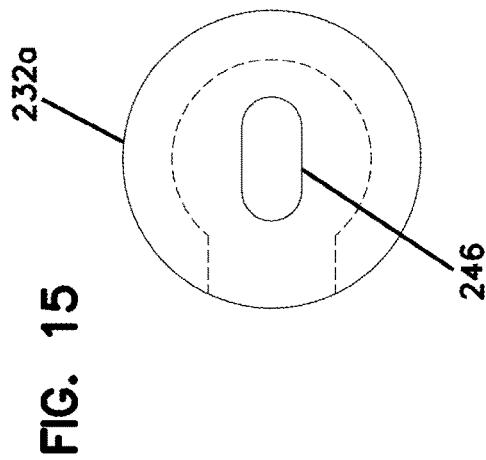
FIG. 15 is an end view of a second end of the fan-out block of FIG. 13.
Figure 14:
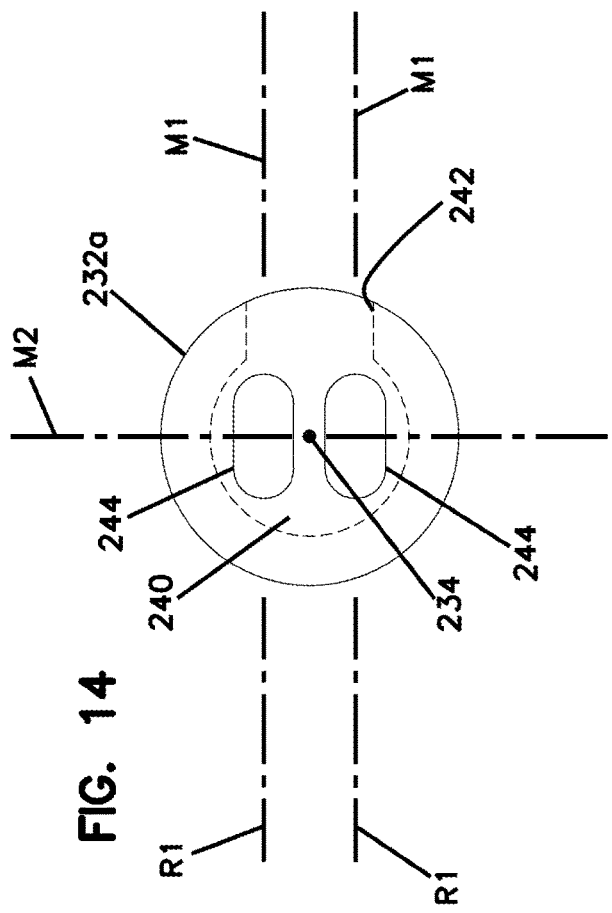
FIG. 14 is an end view of a first end of the fan-out block of FIG. 13.
Figure 18:
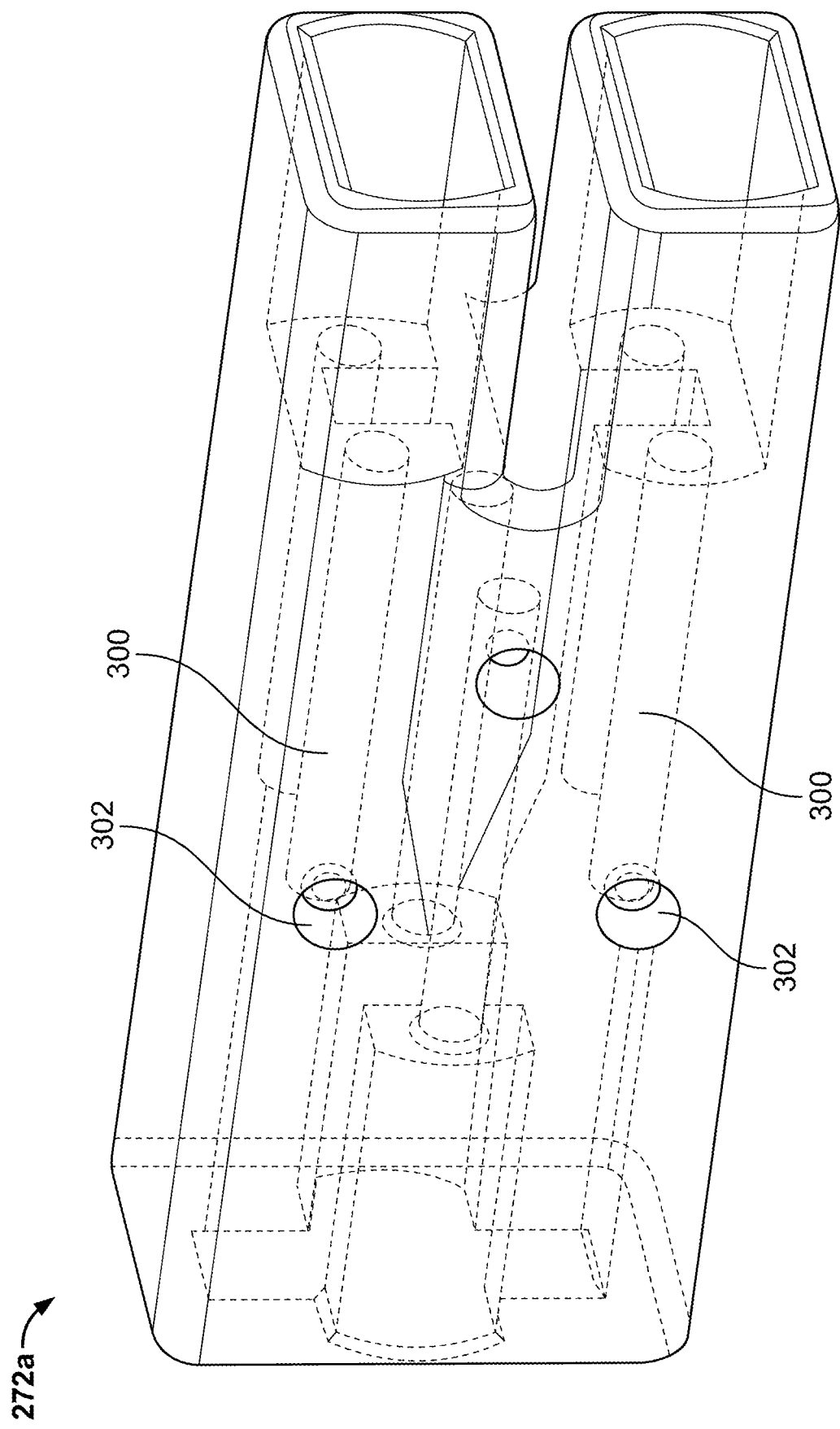
FIG. 18 illustrates a further fan-out structure in accordance with the principles of the present disclosure.

As shown at FIG. 11, transverse cross-sectional shapes of the first axial cable receptacles 244 define major and minor axes M1, M2, and the side window 242 is positioned to be intersected by a reference plane R1 that bisects the first axial cable receptacles along their minor axes M2. FIGS. 13-15 show an alternative fan-out block 232a where the window 242 has been rotated 90 degrees about the axis 234 as compared to the example of FIGS. 9-12. In the example of FIGS. 13-15, the side window 242 is positioned to be intersected by reference planes R1 that bisect the first axial cable receptacles along their major axes M1.

FIG. 16 shows a fan-out structure including a fan-out body 260 having toothed pockets 262 at one end for receiving jacketed ends of stub cables and a toothed pocket 264 at an opposite end for receiving a jacketed end of a main cable. Strength member receptacles 266 are provided for individually receiving strength members (e.g., GRP rods) of the main cable and the stub cables.

Figure 19:
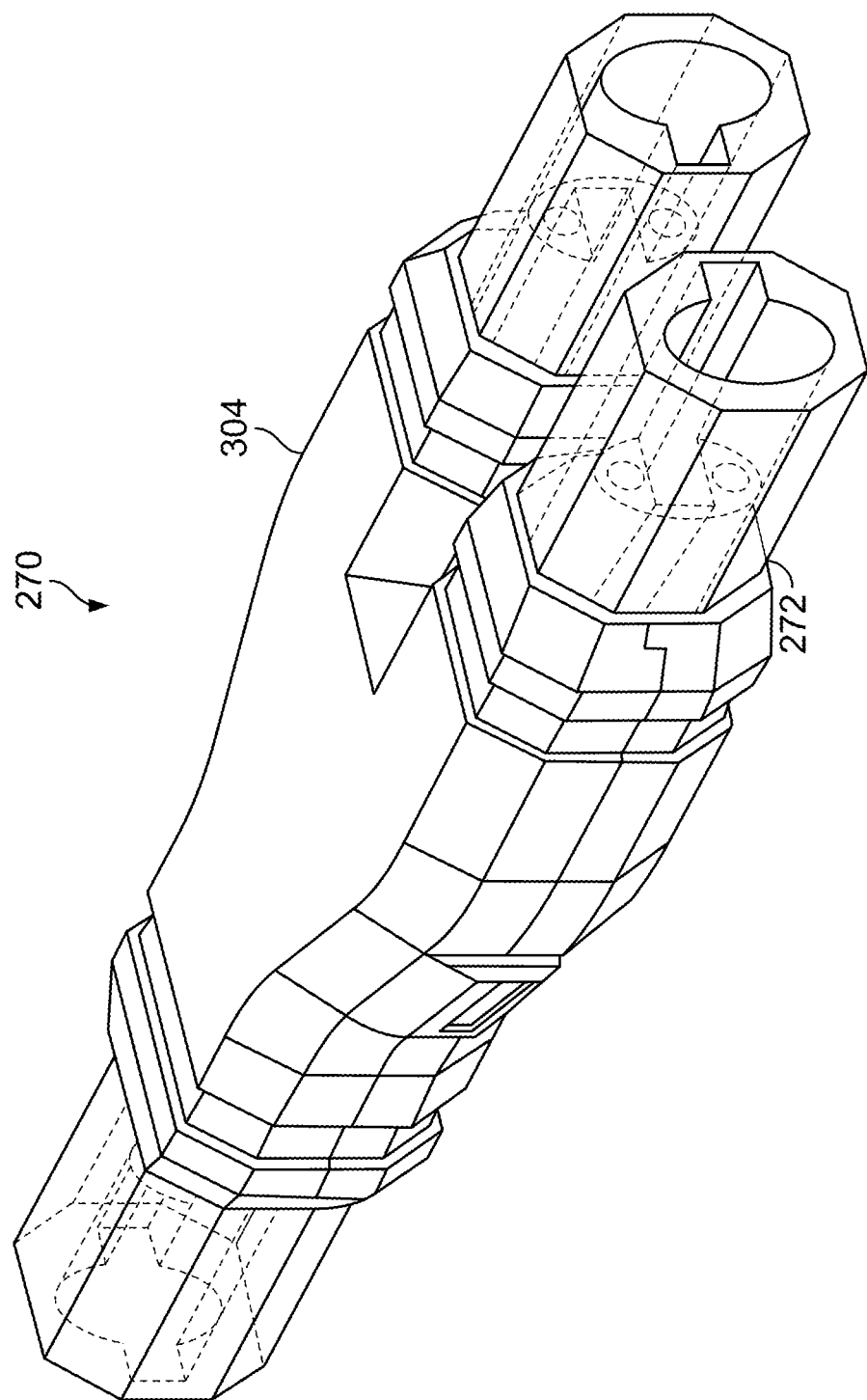
FIG. 19 shows still another fan-out structure in accordance with the principles of the present disclosure.
Figure 20:
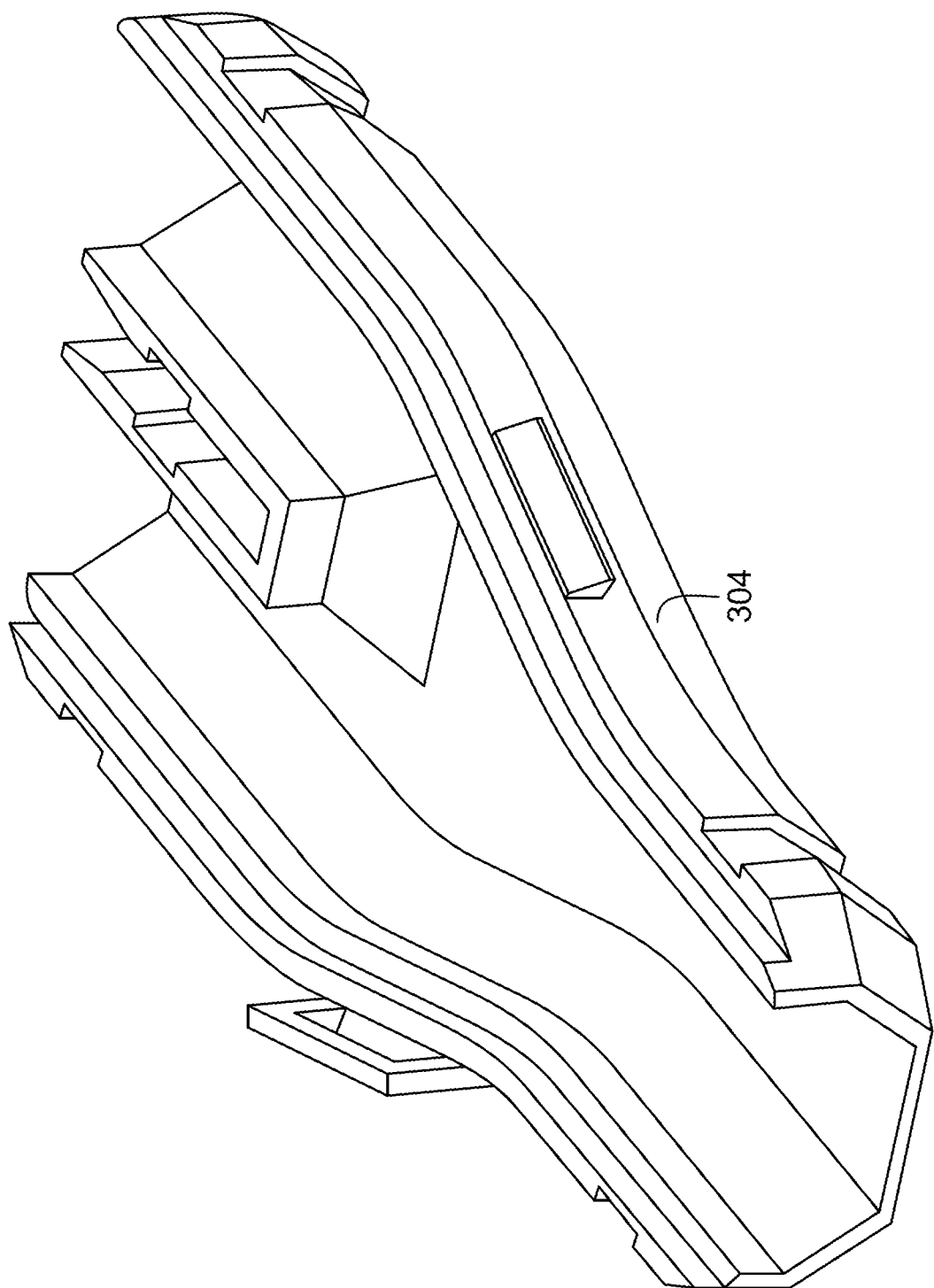
FIG. 20 is a half of a cover adapted to enclose the fan-out structure of FIG. 19.
Figure 21:
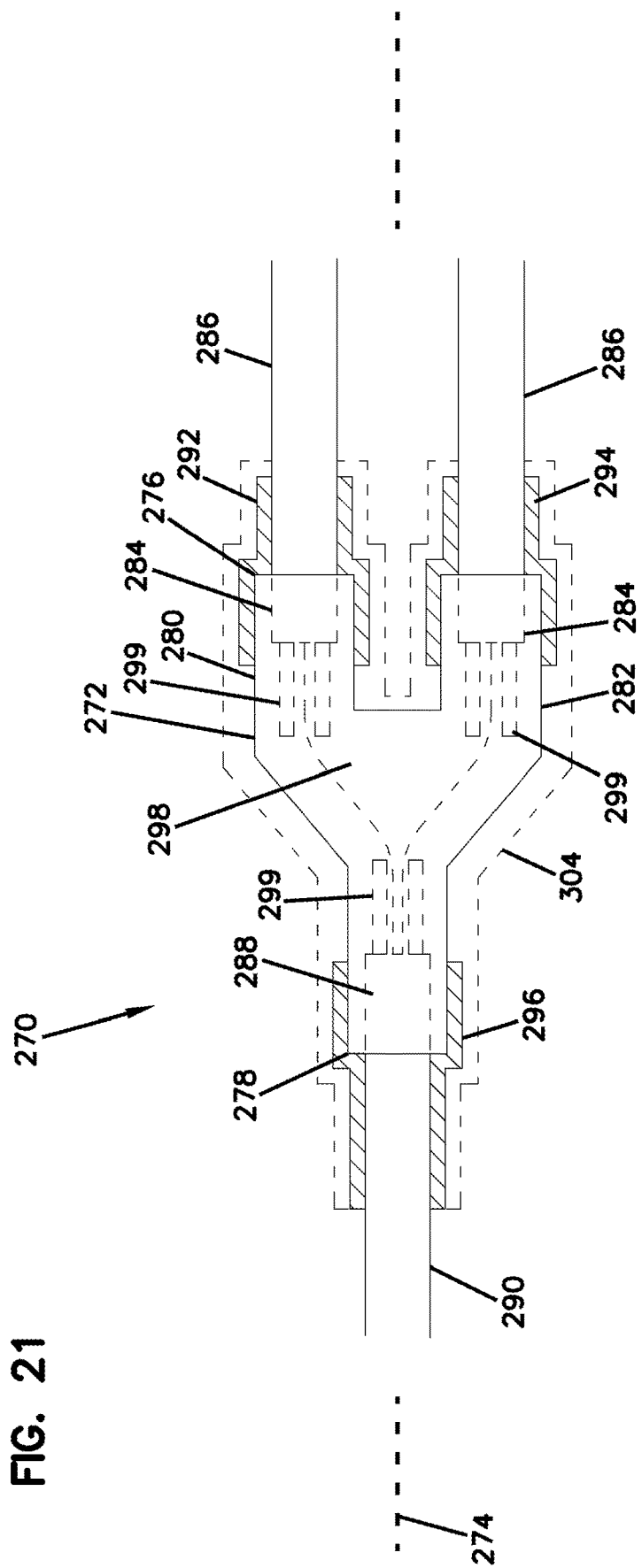
FIG. 21 is a schematic view showing the fan-out structure of FIG. 19.
Figure 22:
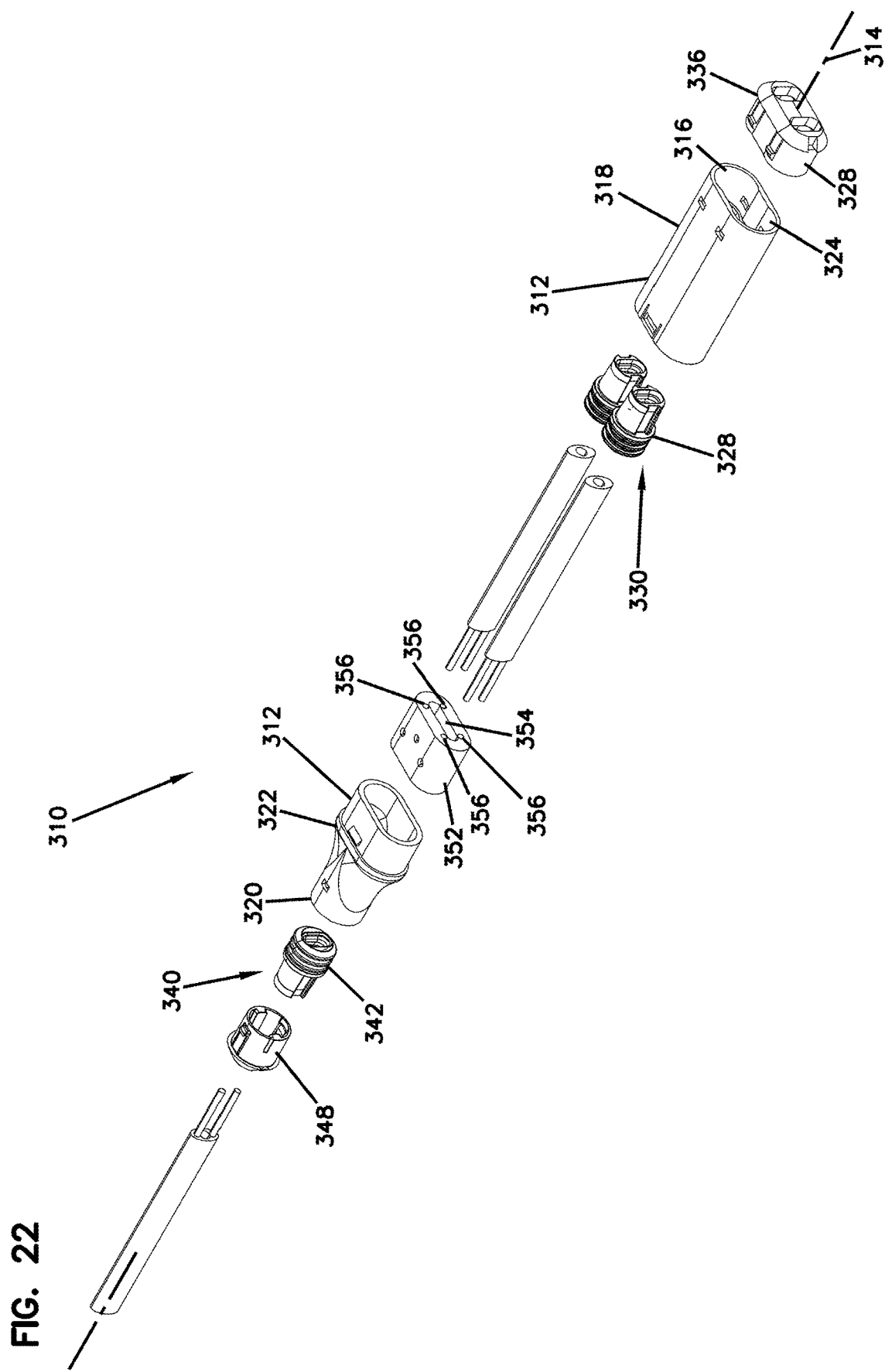
FIG. 22 is an exploded view of a further fan-out structure in accordance with the principles of the present disclosure.
Figure 23:
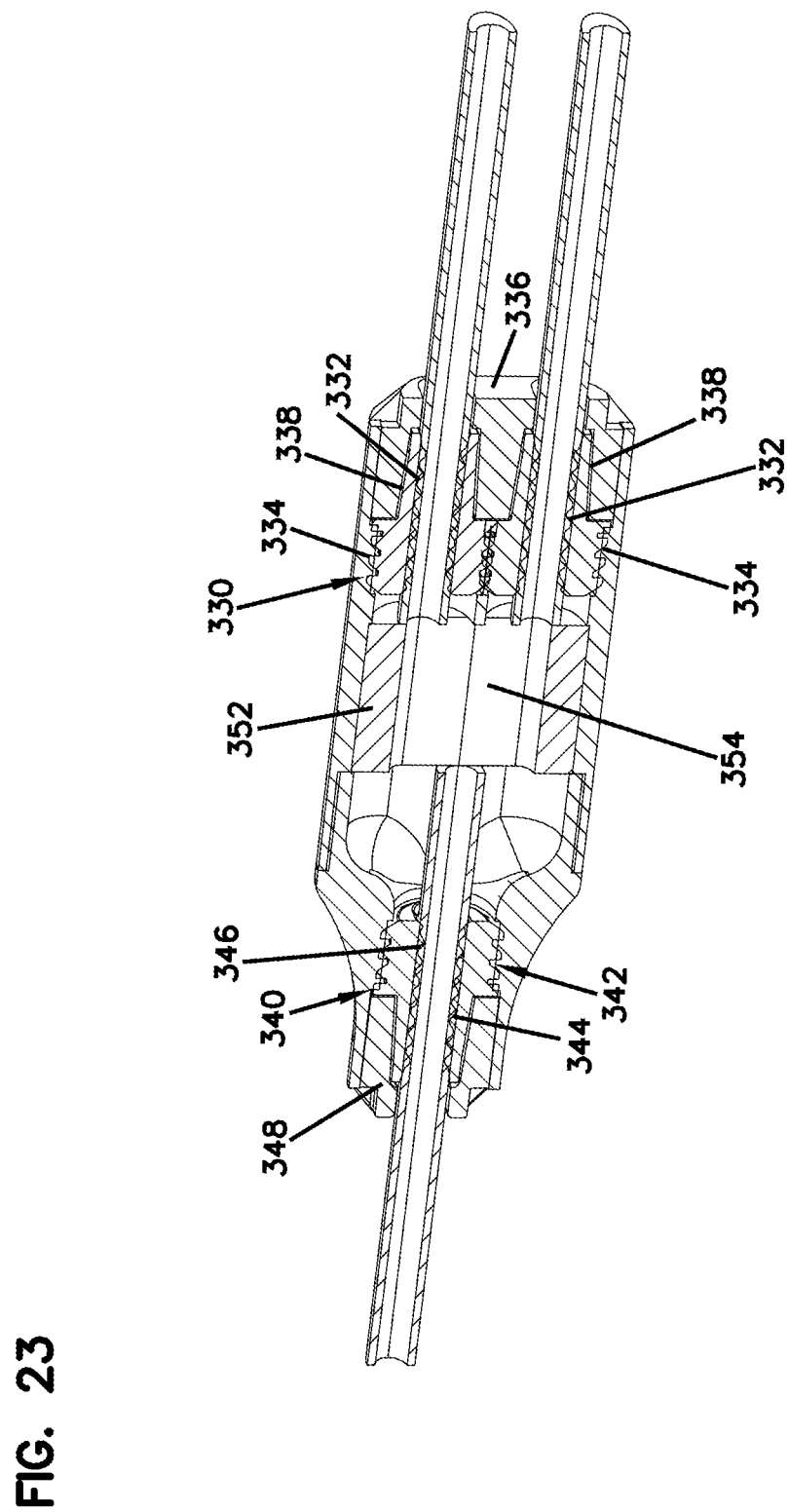
FIG. 23 is a cross-sectional view of the fan-out structure of FIG. 22.
Figure 24:
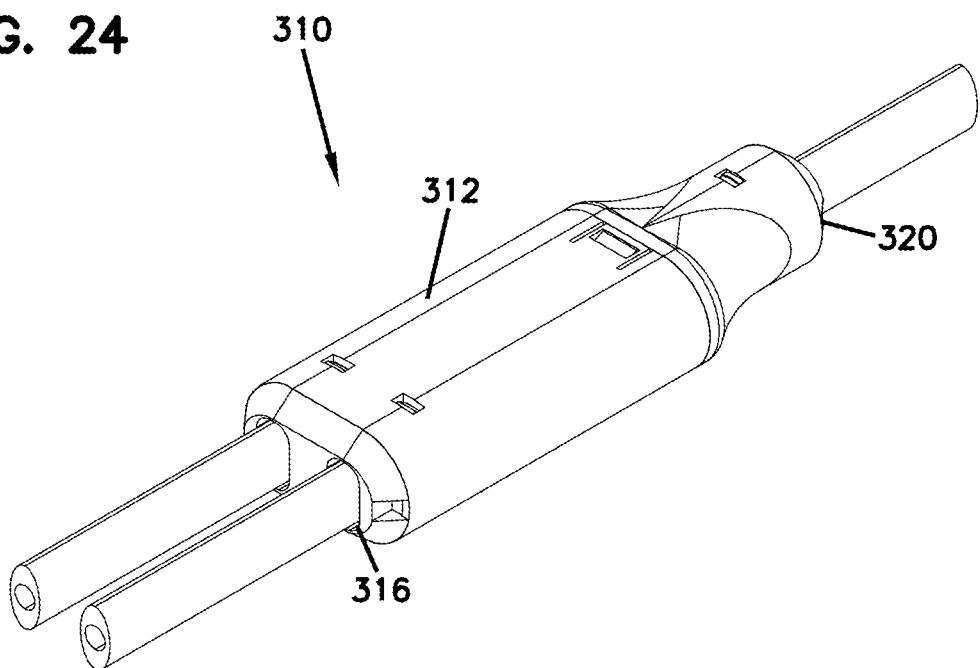
FIG. 24 is a perspective view of the fan-out structure of FIG. 22.
Figure 25:
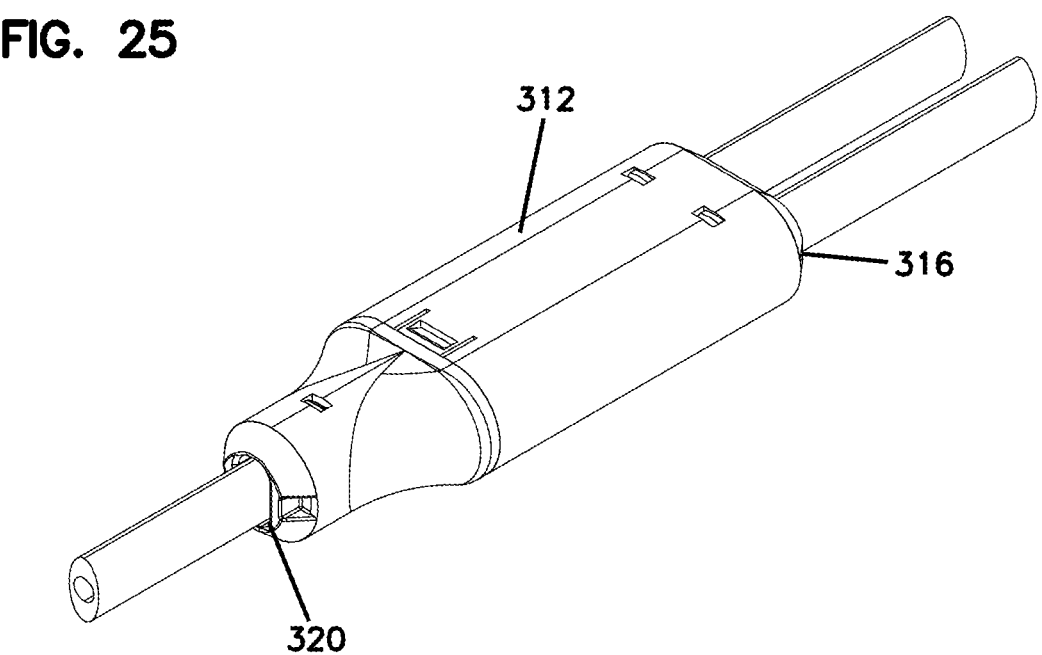
FIG. 25 is another perspective view of the fan-out structure of FIG. 22.

FIGS. 19-21 shows a fan-out assembly 270 in accordance with the principles of the present disclosure. The fan out assembly 270 includes a fan-out block 272 that extends along an axis 274. The fan-out block 272 has a first axial end 276 and an opposite second axial end 278. The first axial end 276 has a furcated configuration with first and second legs 280, 282. Each of the first and second legs 280, 282 defines a break-out cable receptacle 284 in which a break-out cable 286 is secured. The second axial end 278 defines a main cable receptacle 288 in which a main cable 290 is secured. The fan-out assembly 270 also includes separate heat shrink sleeves 292, 294 secured over each of the legs 280, 282 and their corresponding break-out cables 286 and also includes a separate heat shrink sleeve 296 positioned over the second axial end 278 of the fan-out block 272 and the main cable 290. In one example, strength members 299 of the break-out cables 286 and the main cable 290 are secured by adhesive within a common internal chamber 298 (see FIGS. 21 and 17) within the fan-out block. In another example, strength members of the break-out cables and the main cable are secured by adhesive within separate strength member receptacles 300 (see fan-out block 272a of FIG. 18). In certain examples, the strength members include glass reinforced rods. In certain examples, the fan-out block includes separate epoxy injection ports 302 for each of the strength member receptacles 300. In certain examples, the fan-out block 272 is constructed of a plastic material through which ultraviolet light can pass. In certain examples, an outer housing 304 (half shown at FIG. 20) that blocks the passage of UV radiation and covers the fan-out block 272 as well as at least parts of each of the heat shrink sleeves. FIG. 17 shows a fan-out block 272b having furcation legs that are contoured to have opposing flat sides and convex portions that curve between the rounded sides.

FIGS. 22-25 show a fan-out assembly 310 in accordance with the principles of the present disclosure. The fan-out assembly 310 includes a fan-out housing 312 that extends along an axis 314. The fan-out housing 312 includes a first axial end 316 defined by a first housing piece 318 and a second axial end 320 defined by a second housing piece 322. The first axial end 316 defines an elongate receptacle 324 and the second axial end 320 defines a main cable receptacle 326. A first sealing arrangement 328 mounts within the elongate receptacle 324 at the first axial end of the fan-out housing 312 for sealing break-out cables routed into the fan-out housing 312. The first sealing arrangement 328 also includes an elastomeric gasket arrangement 330 for receiving the breakout cables. The elastomeric gasket arrangement 330 includes first annual ribs 332 for sealing against the break-out cables and second annular ribs 334 for sealing against an interior of the fan-out housing 312. The first sealing arrangement 328 also includes an insert 336 that fits within the first end 316 of the fan-out housing 312 and compresses the elastomeric gasket arrangement 330. The insert 336 and the gasket arrangement 330 meet at a nested, tapered interface 338. A second sealing arrangement 340 mounts within the second axial end 320 of the fan-out housing 312 for sealing a main cable routed into the fan-out housing 312 through the main cable receptacle 326. The second sealing arrangement includes an elastomeric gasket 342 for receiving the main cable. The elastomeric gasket 342 including first annular ribs 344 for sealing against the main cable and second annular ribs 346 for sealing against an interior of the fan-out housing 312. The second sealing arrangement 340 also includes an insert 348 that fits within the second end 320 of the fan-out housing 312 and compresses the elastomeric gasket 342. The insert 348 and the gasket 342 meet at a nested, tapered interface 350. A cable anchoring block 352 is mounted within the fan-out housing 312. The cable anchoring block 352 includes an elongate central opening 354 through which optical fibers from the main cable are routed to reach the break-out cables. The cable anchoring block 352 further includes cable strength member receptacles 356 positioned on opposite sides of the elongate central opening 354 for receiving strength rods of the break-out cables and strength rods of the main cable. The strength rods can be adhesively affixed in the cable strength member receptacles 356. In one example, an o-ring seal or other seal can be compressed between the first and second housing pieces to seal the interface between the two housing pieces.

Various modifications and alterations of this disclosure will become apparent to those skilled in the art without departing from the scope and spirit of this disclosure, and it should be understood that the scope of this disclosure is not to be unduly limited to the illustrated examples set forth herein.

What is claimed is:

1. An indexing component comprising:
a first stub cable terminating at a first multi-fiber connector, the first stub cable including a first set of optical fibers having ends supported at first sequential fiber positions defined by the first multi-fiber connector;
a second stub cable terminating at a second multi-fiber connector, the second stub cable including a second set of optical fibers having ends supported at second sequential fiber positions defined by the second multi-fiber connector;
a main cable including the first and second sets of optical fibers;
a fan-out for coupling the first and second stub cables to the main cable;
a first multi-fiber connection interface defining third sequential fiber positions;
a second multi-fiber connection interface defining fourth sequential fiber positions;
the first set of optical fibers including a drop fiber that is routed from the first multi-fiber connector to a drop location;
the first set of optical fibers including indexing fibers that are routed in an indexed configuration between the first sequential fiber positions and the third sequential fiber positions; and
the second set of optical fibers including first indexing fibers that are routed in an indexed configuration between the second sequential fiber positions and the fourth sequential fiber positions.

2. The indexing component of claim 1, wherein the second set of optical fibers include a second indexing fiber that is routed in an indexed configuration from the second multi-fiber connector to the first multi-fiber connection interface.

3. The indexing component of claim 2, wherein the first set of optical fibers includes a plurality of drop fibers that are routed from the first multi-fiber connector to one or more drop locations, and wherein the second set of optical fibers include a plurality of second indexing fibers that are routed in an indexed configuration from the second multi-fiber connector to the first multi-fiber connection interface.

4. The indexing component of claim 1, wherein the first and second sets of optical fibers each include 12 or more optical fibers.

5. The indexing component of claim 1, wherein the first multi-fiber connector, the second multi-fiber connector, the first multi-fiber interface and the second multi-fiber interface each include a multi-fiber ferrule for defining fiber sequencing.

6. The indexing component of claim 1, wherein the first and second multi-fiber connectors are ruggedized.

7. The indexing component of claim 1, wherein the first and second multi-fiber connection interfaces are defined at ruggedized ports in a housing.

8. The indexing component of claim 1, wherein the first and second stub cables have different lengths such that the first and second multi-fiber connectors are axially staggered with respect to each other.

9. An indexing component comprising:
stub cables terminating at multi-fiber connectors, the stub cables including sets of optical fibers having ends supported at a first set of sequential fiber positions defined by a combination of the multi-fiber connectors such that the sequential fiber positions are sequenced across the multi-fiber connectors;
a main cable including the sets of optical fibers;
a fan-out for coupling the stub cables to the main cable;
separate multi-fiber connection interfaces defining a second set of sequential fiber positions defined by a collection of the multi-fiber connection interfaces such that the sequential fiber positions are sequenced across the multi-fiber connection interfaces;
the sets of optical fibers including a drop fiber that is routed from the first set of sequential fiber positions to a drop location; and
the sets of optical fibers also including indexing fibers that are routed in an indexed configuration between the first set of sequential fiber positions and the second set of sequential fiber positions.

10. The indexing component of claim 9, wherein the drop location includes a ruggedized port.

11. The indexing component of claim 10, wherein the ruggedized port is provided at a terminal.

12. The indexing component of claim 9, wherein the drop fiber is terminated by a single-fiber optical connector.

13. The indexing component of claim 9, wherein the sets of optical fibers include a second drop fiber that is routed from the first set of sequential fiber positions to a second drop location.

14. The indexing component of claim 13, wherein the second drop location is provided at a terminal.

15. The indexing component of claim 9, further comprising another drop fiber that is routed from the second set of sequential fiber positions to another drop location, the another drop fiber being separate from the main cable.

16. The indexing component of claim 15, wherein the another drop location includes a ruggedized port provided at a terminal.

17. The indexing component of claim 16, wherein the another drop fiber is fully contained within the terminal.

18. The indexing component of claim 9, wherein the multi-fiber connection interfaces defining the second set of sequential fiber positions are provided at a terminal.

19. The indexing component of claim 9, wherein the multi-fiber connectors are devoid of empty sequential fiber positions.

20. The indexing component of claim 9, wherein the multi-fiber connection interfaces include multi-fiber connectors.

* * * * *